(12) United States Patent
Nakagome et al.

(10) Patent No.: US 7,678,427 B2
(45) Date of Patent: Mar. 16, 2010

(54) PROCESS FOR PRODUCING AGING-RESISTANT RUBBER MATERIAL

(75) Inventors: Seiji Nakagome, Tsukuba (JP); Mitsuyasu Nakajima, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 1037 days.

(21) Appl. No.: 10/533,678

(22) PCT Filed: Nov. 19, 2003

(86) PCT No.: PCT/JP03/14708

§ 371 (c)(1),
(2), (4) Date: May 2, 2005

(87) PCT Pub. No.: WO2004/050757

PCT Pub. Date: Jun. 17, 2004

(65) Prior Publication Data

US 2006/0035028 A1 Feb. 16, 2006

(30) Foreign Application Priority Data

Nov. 29, 2002 (JP) ............................. 2002-346802

(51) Int. Cl.
*B05D 3/02* (2006.01)
(52) U.S. Cl. .................................................. 427/393.5
(58) Field of Classification Search ............... 427/393.5
See application file for complete search history.

(56) References Cited

U.S. PATENT DOCUMENTS

| 1,918,524 | A | * | 7/1933 | Eberhard | .................... 152/429 |
| 3,663,305 | A | | 5/1972 | Hoffman et al. | |
| 3,914,478 | A | * | 10/1975 | Johansson et al. | ......... 427/393.5 |
| 4,049,875 | A | * | 9/1977 | Edie | ............................ 428/462 |
| 4,096,009 | A | * | 6/1978 | Yoshida | ...................... 156/151 |
| 4,217,395 | A | * | 8/1980 | Kuan et al. | .................. 428/494 |
| 5,122,420 | A | * | 6/1992 | Baron et al. | ............. 428/474.4 |
| 5,182,142 | A | * | 1/1993 | Hart et al. | ................. 427/393.5 |

FOREIGN PATENT DOCUMENTS

| JP | 52-78682 A | | 7/1977 |
| JP | 05-001163 | * | 1/1993 |
| JP | 2001-001449 | * | 1/2001 |
| JP | 2003-2991 A | | 1/2003 |
| WO | WO 01/29126 | * | 4/2001 |

OTHER PUBLICATIONS

JP 2001-001449, Jan. 2001, Abstracts and partial machine translation.*

* cited by examiner

*Primary Examiner*—Erma Cameron
(74) *Attorney, Agent, or Firm*—Brinks Hofer Gilson & Lione

(57) ABSTRACT

An aging-resistant rubber material with an improved heat resistance without deteriorating the moldability even if a rubber layer is formed from an aqueous latex of rubber and without any cost increase, even if a surface tack prevention treatment by an antitack agent is carried out, can be produced by applying a coating liquid containing an amine-based antioxidant in solution or dispersion to the surface of a cross-linked rubber material, followed by heating to a temperature of 80° C. or higher, thereby diffusing the amine-based antioxidant into the rubber material. When a coating solution containing an antitack agent together with the amine-based antioxidant in solution or dispersion is used, the surface tack prevention treatment of the cross-linked material as a product can be made at the same time.

6 Claims, No Drawings

PROCESS FOR PRODUCING AGING-RESISTANT RUBBER MATERIAL

TECHNICAL FIELD

The present invention relates to a process for producing an aging-resistant rubber material, and more particularly to a process for producing an aging-resistant rubber material with improved heat resistance while maintaining the moldability.

BACKGROUND ART

Improvement of the heat resistance of rubber material has been so far made by addition of an antioxidant thereto. Heat resistance and aging resistance can be very effectively improved by the addition of the antioxidant, but further improvement of heat resistance is still now a requirement for prolonging the product life.

However, it is the accepted knowledge that there is an optimal amount of the antioxidant to be added, and even a simple increase in the amount of antioxidant to be added can never contribute to a desired functional improvement, corresponding to such an increment of the added antioxidant. Addition of a larger amount of the antioxidant than the optimal amount will inhibit the cross-linking reaction and also will lower the physical properties of the resulting rubber material. From the viewpoint of productivity, high speed cross-linking of rubber is required, and cross-linking retardation (cross-linking inhibition) has an adverse effect on product cost. Thus, it has been desired to attain high speed cross-linking and also to improve the product life, without addition of a large amount of an antioxidant to a rubber layer.

Rubber materials are often used upon compositing with metallic materials, where, for example, an aqueous latex of rubber is applied to a metallic sheet, followed by cross-linking to conduct compositing. In that case, an antioxidant must be added to an aqueous latex of rubber to make the resulting rubber layer contain the antioxidant, but by the initial addition of the antioxidant the latex will, in some cases, loose the dispersion stability, resulting in gellation and molding failure of rubber materials, whereas without the addition of the antioxidant no improvement of the heat resistance of the rubber materials can be attained. This is a problem.

Generally, the rubber materials have some tackiness due to a flexibility in the nature, so extraneous matters such as dusts, etc. are liable to attach to the tacky surface, creating disagreeable touch and mutual adhesion of rubber products themselves, and thus surface coating with an antitack agent is often carried out to improve the surface tackiness. However, such a surface tack prevention treatment leads to increasing cost of rubber products, so their application and use are often restricted.

DISCLOSURE OF THE INVENTION

An object of the present invention is to provide a process for producing an aging-resistant rubber material capable of improving the heat resistance while maintaining the moldability even in case of forming a rubber layer, using an aqueous latex of rubber, and having nothing to do with increasing cost even in case of conducting a surface tack prevention treatment with an antitack agent.

The object of the present invention can be attained by applying a solution or a dispersion of an amine-based antioxidant as a coating liquid to the surface of cross-linked rubber material, followed by heating to 80° C. or higher, thereby diffusing the amine-based antioxidant into the rubber material to produce an aging-resistant rubber material. When a coating liquid containing an antitack agent together with the amine-based antioxidant in solution or dispersion is used, the surface tack prevention treatment of cross-linked rubber materials as products can be carried out at the same time.

Cross-linked rubber materials for use in the present invention includes rubber materials such as acrylic rubber, NBR, hydrogenated NBR, SBR, fluoroelastomer, etc. as subjected to cross-linking molding beforehand. Rubber materials containing a normal quantity or less quantity of the amine-based antioxidant beforehand may be used. In the present invention, the amine-based antioxidant is further diffused into the rubber materials from the surface, and thus it is not necessary that the rubber materials contains a sufficient quantity or an excess quantity of the amine-based antioxidant at the time of rubber cross-linking. Thus, cross-linking inhibition or lowering of physical properties by the antioxidant can be prevented thereby.

In the present invention, no antioxidant is contained at all in the rubber material at the time of cross-linking, or, if contained, a substantially small quantity of the antioxidant will do at the time of cross-linking, so not only cross-linking inhibition or lowering of physical properties by the antioxidant can be prevented, but also high speed cross-linking can be easily attained. Furthermore, the antioxidant as coated on the surface will diffuse into the rubber materials from the surface, so it is expectable that there is a much larger quantity of the antioxidant in the region near the surface, and drastic improvement of heat resistance can be attained. Generally, heat aging occurs due to the action of oxygen in the air and thus proceeds from the rubber surface layer inwardly. In the present invention, the antioxidant is unevenly distributed much. more in the surface layer region, and the improvement of heat resistance is more prominent, as compared with that in the case of simple uniform compounding.

Particularly in the case that the rubber layer is a peroxide cross-linking type or is to be formed from an aqueous emulsion, direct addition of the antioxidant to rubber is restricted. That is, in the case of peroxide cross-linking type, most of the antioxidants act as a suppressing agent against the organic peroxide cross-linking reaction, so neither added organic peroxide nor antioxidant can perform satisfactory functions corresponding to the quantity as added thereto. In the case of the aqueous emulsion type, gellation will be easy to take place by addition of the antioxidant thereto, as already mentioned before. In the present invention, on the other hand, the antioxidant is made to diffuse into the cross-linked rubber layer by coating, whereby such inconveniences as cross-linking inhibition or gellation of the coating liquid can be substantially eliminated.

Such effective diffusion of the amine-based antioxidant into the cross-linked rubber materials is carried out by applying a coating liquid containing the amine-based antioxidant in solution or dispersion to the surface of the cross-linked rubber materials, followed by heating to 80° C. or higher.

The amine-based antioxidant for use in the present invention includes, for example, 2,2,4-trimethyl-1,2-dihydroquinoline polymer, 6-ethoxy-1,2-dihydro-2,2,4-trimethylquinoline, phenyl-1-naphthylamine, lower alkylated diphenylamine, octylated diphenylamine, 4,4'-bis($\alpha,\alpha$-dimethylbenzyl)-diphenylamine, p-(p-toluenesulfonylamido)diphenylamine, N,N'-di(2-naphthyl)-p-phenylenediamine, N,N'-diphenyl-p-phenylenediamine, N-phenyl-N'-isopropyl-p-phenylenediamine, N-phenyl-N'-(1,3-dimethyl-butyl)-p-phenylenediamine, N-phenyl-N'-(3-methacryloyloxy-2-hydroxy-propyl)-p-phenylenediamine, etc. Other antioxidants than the amine-based ones, for example, phenol based one or sulfur based one have no appreciable effect upon the heat resistance improvement.

These antioxidants are used as post-additive antioxidants, separate from the initial additive ones, in a proportion of about 0.1 to about 10 wt. %, preferably about 0.2 to about 5 wt. % on the basis of the weight of the rubber layer. Below about 0.1 wt. %, the desired effect of the present invention upon the heat resistance improvement can be hardly obtained, whereas a proportion above about 10 wt. % cannot be cost-wise recommended.

An antitack agent such as paraffinic wax, graphite, etc. can be used together with the amine-based antioxidant to improve the heat resistance and prevent the surface tackiness at the same time. It is desired to use the antitack agent in a ratio by weight of about 0.5 to about 300, preferably about 0.5 to about 200, to the amine-based antioxidant.

The amine-based antioxidant or the antitack agent together are used as dissolved or dispersed in at least one of ketones such as acetone, methyl ethyl ketone, methyl isobutyl ketone, etc., aromatic hydrocarbons such as toluene, xylene, etc. and alcohols such as methanol, ethanol, isopropanol, etc. as a coating liquid. In the case that these organic solvents are not available or their use is to be avoided, they are used as an aqueous dispersion.

The coating liquid containing the amine-based antioxidant or the antitack agent together as dissolved or dispersed (concentration: about 1 to about 80 wt. %, preferably about 2 to about 50 wt. %) can be applied to the surface of cross-linked rubber materials by an ordinary method, such as spray coating, dipping, roll coating, flow coating, etc.

After the coating, fixation of the antioxidant (and the antitack agent) to the surface and diffusion thereof into the rubber layer can be carried out by heat-drying. Temperature and duration of heat treatment depend on the heat resistance of the rubber layer to be treated and the species of solvents capable of dissolving the surface layer, but are usually 80° to 300° C. for about 10 seconds to about 20 minutes, preferably about 20 seconds to about 10 minutes. Such heat treatment can be carried out divisionally in a plurality of runs.

To keep a concentration of amine-based antioxidant diffused into the rubber layer, for example, at minimum 0.5 phr in the every thickness direction, the rubber layer having a thickness of 5 to 300 μm, preferably 5 to 150 μm, must be formed, because concentration of the antioxidant diffused into the rubber layer will be continuously decreased from the surface layer inwardly, and will be about 1 phr at the thickness level of about 300 μm.

In the present invention, diffusion of the antioxidant (and the antitack agent) into the rubber layer can be effectively carried out in the case of a rubber layer of metal-rubber laminate materials to improve the heat resistance (and to prevent tackiness) of the rubber layer laminated with metallic sheets.

BEST MODES FOR CARRYING OUT THE INVENTION

The present invention will be described below, referring to Examples.

Example 1

| | Parts by weight |
|---|---|
| Acrylic rubber (PA-402, a product of Unimatec Co.) | 100 |
| HAF carbon black | 55 |
| Stearic acid | 1 |
| 4,4'-bis(α,α-dimethylbenzyl) diphenylamine (Antioxidant CD, a product of Ouchi-Shinko Kagaku Co.) | 2 |
| Sulfur | 0.3 |

-continued

| | Parts by weight |
|---|---|
| Potassium stearate | 3 |
| Sodium stearate | 0.25 |

The foregoing components were kneaded through a 10 inch open roll mill. The resulting kneaded mixture was subjected to press cross-linking at 180° C. for 8 minutes and then to oven cross-linking at 175° C. for 4 hours, whereby an acrylic rubber sheet having a thickness of 2 mm was obtained.

The resulting acrylic rubber sheet was dipped into an antioxidant solution A (6 wt. % of antioxidant CD in toluene) for 5 seconds, then taken out therefrom, and air dried, followed by heat treatment at 160° C. for 180 seconds. The amount of the antioxidant diffused into the rubber sheet by the dipping operation was determined by gravimetric analysis, and found to be about 0.5 parts by weight. Total amount of Antioxidant CD ultimately taken into the acrylic rubber was 2.5 parts by weight (on the charge basis).

Then, the following test was conducted:

Heat resistance: Heated air aging test was carried out at 175° C. for 70 hours to determine pre-test rubber hardness and post-test change in rubber hardness

Comparative Example 1

In Example 1, the dipping into the antioxidant solution A was not carried out.

Comparative Example 2

In Example 1, the amount of antioxidant CD in the acrylic rubber kneaded mixture was changed to 2.5 parts by weight, and the dipping into the antioxidant solution A was not carried out.

Results of determination and evaluation in Example 1 and Comparative Examples 1~2 are shown in the following Table 1.

TABLE 1

| Heat resistance | Ex. 1 | Comp. Ex. 1 | Comp. Ex. 2 |
|---|---|---|---|
| Before heat aging | | | |
| JIS A hardness | 67 | 67 | 65 |
| After heat aging | | | |
| Change in hardness (points) | +6 | +9 | +9 |

Example 2

| | Parts by weight |
|---|---|
| NBR (N237, a product of JSR) | 100 |
| SRF carbon black | 60 |
| N-phenyl-N'-(1,3-dimethylbutyl)-p-phenylene-diamine (Antioxidant 6C, a product of Ouchi-Shinko Kagaku Co.) | 2 |
| Organic peroxide (Percumyl D) | 4 |
| Solvent (toluene) | 360 |

The foregoing components were mixed together, and the resulting NBR solution was subjected to lamination to a thickness of 80 μm on a SPCC steel sheet (thickness: 200 μm) through a phenol resin-based adhesive (Thixon-7, a product of Morton International Co.), followed by press cross-linking at 220° C. for 30 seconds to obtain a metal-NBR laminate material.

The resulting metal-NBR laminate material was dipped into an antioxidant solution B (6 wt. % solution in isopropanol of 2 parts by weight of Antioxidant 6C and 4 parts by weight of an antitack agent, G79R, a product of Resino color Co.) for 5 seconds, taken out therefrom, and air dried, followed by heat treatment at 180° C. for 90 seconds. The amount of Antioxidant 6C diffused into the rubber layer of the metal-rubber laminate material by the dipping operation was determined by gravimetric analysis, and found to be about 2.0 parts by weight. Total amount of Antioxidant 6C ultimately taken into NBR was 4.0 parts by weight (charge basis).

The following tests were conducted:

Heat resistance: Heated air aging test was carried out at 120° C. for 70 hours to determine pre-test pencil hardness and post-test pencil hardness Tackiness: A SUS304 steel sheet was used as a cover plate at the time of press cross-linking to observe the tackiness between the NBR and the cover plate As to the laminate materials treated with an antitack agent, two sheets of the laminate materials were laid one upon another on the NBR sides, followed by pressing under a pressing force of 0.5 MPa to observe the tackiness there between Comparative Example 3

In Example 2, dipping of the metal-rubber laminate material was carried out not in the antioxidant solution B, but in an antitack agent solution (4 wt. % of antitack agent G79R solution in isopropanol).

Comparative Example 4

In Comparative Example 3, the amount of Antioxidant 6C in the NBR kneading product was changed to 4 parts by weight.

Comparative Example 5

In Comparative Example 4, the press cross-linking time at 220° C. was changed from 30 seconds to 60 seconds.

Comparative Example 6

In Example 2, the dipping into the antioxidant solution B was not carried out.

Example 3

| | Parts by weight |
|---|---|
| NBR latex (Nipol 1571, a product of Nippon Zeon Co., solid concentration: 40 wt. %) | 250 |
| SRF carbon black | 50 |
| Zinc white No. 3 | 10 |
| Organic peroxide (Perhexa 25B) | 3 |

An aqueous mixture consisting of the foregoing components was applied to an SPCC steel sheet through a phenol resin-based adhesive (Thixon P-7) and dried to obtain a laminate with a thickness of 120 μm. Then, press cross-linking was carried out at 220° C. for 30 seconds to obtain a metal-NBR laminate material.

The resulting metal-NBR laminate material was dipped into an antioxidant solution B for 5 seconds, taken out therefrom and air dried, followed by heat treatment at 180° C. for 90 seconds. The amount of Antioxidant 6C diffused into the rubber layer of the metal-NBR laminate material by the foregoing operation was determined by gravimetric analysis and found to be about 2.0 parts by weight (in term of charge basis).

Comparative Example 7

In Example 3, 2 parts by weight (in terms of charge basis) of Antioxidant 6C was added to the aqueous mixture, and it was tried to obtain a laminate material, using the aqueous mixture, but it was found that the polymer was coagulated at the stage of adding Antioxidant 6C thereto, resulting in failure to obtain a rubber cement.

Results of determination and evaluation in the foregoing Examples 2~3 and Comparative Examples 3~6 are shown in the following Table 2.

TABLE 2

| Determination. evaluation items | Ex. 2 | Comp. Ex. 3 | Comp. Ex. 4 | Comp. Ex. 5 | Comp. Ex. 6 | Ex. 3 |
|---|---|---|---|---|---|---|
| Heat resistance | | | | | | |
| Pre-heat aging pencil hardness | 2H | 2H | H | 2H | 2H | 2H |
| Post-heat aging pencil hardness | 3H | 5H | 4H | 5H | 6H | 3H |
| Tackiness | | | | | | |
| At press cross-linking | none | none | found | none | none | none |
| At antitack agent treatment | none | none | none | none | found | none |

Example 4

To determine distribution of antioxidant concentration in Antioxidant 6C-diffused rubber layer formed to a thickness of 150 μm in a metal-NBR laminate material obtained in the same manner as in Example 3, the rubber layer was sliced into thin pieces at every depth of 10 μm from the surface by a microtome, and the antioxidant in the sliced samples were individually extracted with a solvent, and the antioxidant in the individual extracts was quantitatively determined by liquid chromatography method. The results are shown in the following Table 3, where the values in parentheses are parts by weight (pbw) in terms of charge basis.

TABLE 3

| Depth from the surface (μm) | Antioxidant concentration (wt. %) |
|---|---|
| 0-10 | 2.34 (3.9 pbw) |
| 20-30 | 2.04 (3.4 pbw) |
| 40-50 | 1.75 (2.9 pbw) |
| 60-70 | 1.56 (2.6 pbw) |
| 70-80 | 1.39 (2.3 pbw) |
| 140-150 | 0.73 (1.2 pbw) |

INDUSTRIAL UTILITY

The following effects can be obtained according to the present process.

(1) The present process is based on post-addition of an amine-based antioxidant to diffuse into the rubber layer up to the necessary amount, so such adverse effects as cross-linking inhibition by the antioxidant at the time of cross-linking, lowering of physical properties, etc. can be made less to improve the heat resistance. Furthermore, much more diffusion of the antioxidant in the surface layer region more susceptible to thermal damages leads to effective improvement of heat aging resistance.

(2) The rubber material containing a large amount of the initially added amine-based antioxidant suffers insufficient cross-linking, resulting in poor material characteristics (see Comparative Example 4), and when the reaction time is prolonged, a portion of the antioxidant is consumed in the cross-linking reaction, resulting in poor heat resistance (see Comparative Example 5), whereas the present process has effectively solved such a problem as the inhibition of initial charge of a large amount of the antioxidant.

(3) Also in the case of forming the rubber layer from a rubber latex, addition of the antioxidant to the aqueous latex gives rise to polymer coagulation, so addition of the effective antioxidant is inhibitive, whereas the present process has successfully solved such a problem.

(4) Particularly, in the case of using an aqueous latex, the present process has succeeded in improvement of moldability and heat resistance at the same time as already explained before, and furthermore in the case of using the antitack agent together with the antioxidant at the coating stage, a further prominent effect is expectable. That is, the simultaneous treatment with the antioxidant and the antitack agent can contribute to an improvement of the heat resistance and surface tack prevention at the same time, resulting in cost reduction.

(5) In such a step of continuously molding and successively coiling a sheet-form rubber product, it has been so far essential to form a surface protective layer mainly directed to surface tack prevention. In the present process, on the other hand, no special treating step is required for the tackiness prevention, thereby enabling such a continuous molding without any product cost increase.

The invention claimed is:

1. A process for producing an aging-resistant metal-rubber layer laminate material having a rubber layer wherein the rubber layer has a thickness of 5 to 300 μm and is formed from an aqueous latex, which process comprises: applying a coating liquid containing an amine-based antioxidant in solution or dispersion to a surface of a cross-linked rubber layer composited with a metallic material, followed by heating to a temperature of 80° C. or higher, thereby diffusing the amine-based antioxidant into the rubber layer.

2. A process for producing an aging-resistant metal-rubber layer laminate material according to claim 1, wherein the heating is carried out at 80° to 300° C.

3. A process for producing an aging-resistant metal-rubber layer laminate material according to claim 1, wherein the amine-based antioxidant is diffused into the rubber layer in a proportion of 0.1 to 10 wt. % on the basis of the rubber material.

4. A process for producing an aging-resistant metal-rubber layer laminate material according to claim 1, wherein the coating liquid contains an antitack agent together with the amine-based antioxidant.

5. A process for producing an aging-resistant metal-rubber layer laminate according to claim 4, wherein the antitack agent is used in a ratio by weight of 0.5 to 300 to the amine-based antioxidant.

6. A process for producing an aging-resistant metal-rubber layer laminate material according to claim 1, wherein the rubber layer is formed by peroxide cross-linking.

* * * * *